W. C. FRITZ.
INCUBATOR.
APPLICATION FILED FEB. 12, 1917.

1,392,566.

Patented Oct. 4, 1921.
2 SHEETS—SHEET 1.

INVENTOR
William C. Fritz.
By Morsell, Keeney & French
ATTORNEYS

W. C. FRITZ.
INCUBATOR.
APPLICATION FILED FEB. 12, 1917.
1,392,566.
Patented Oct. 4, 1921.
2 SHEETS—SHEET 2.
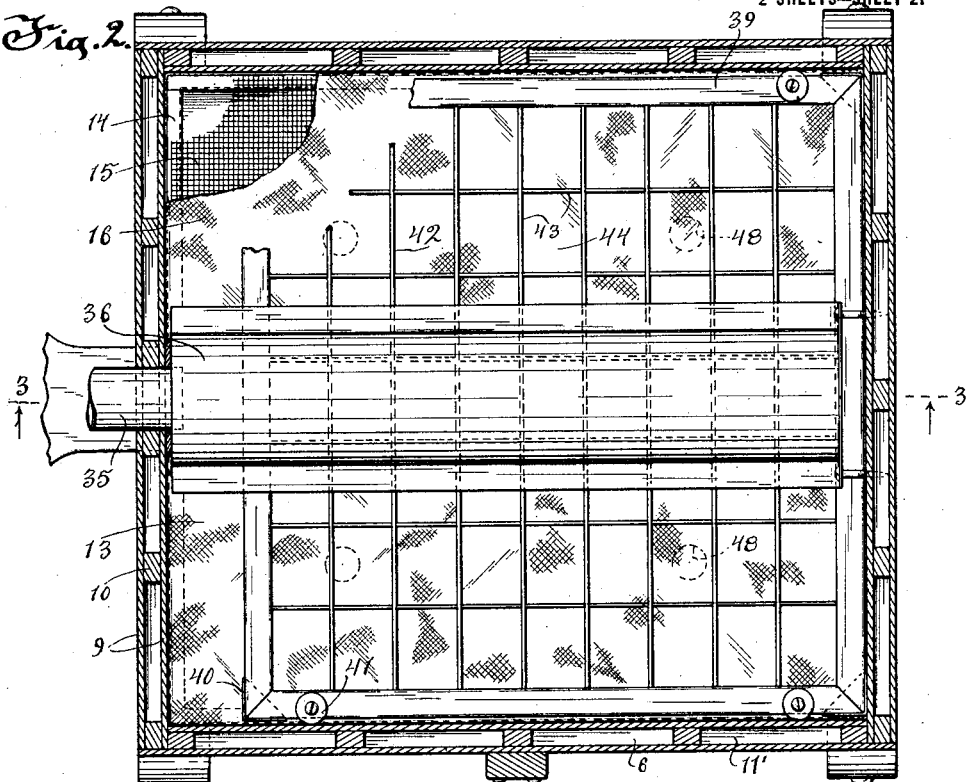
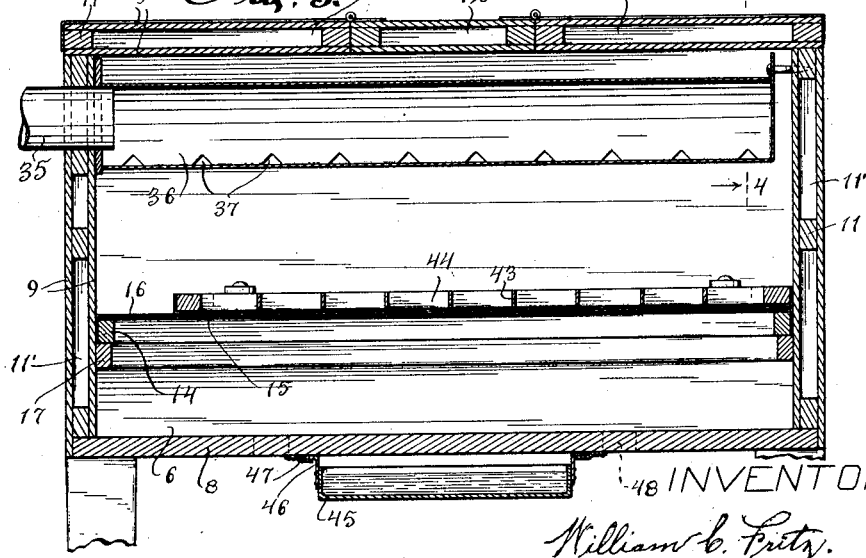
INVENTOR
William C. Fritz.
By Morsell, Keeney & French
ATTORNEYS

UNITED STATES PATENT OFFICE.

WILLIAM C. FRITZ, OF MILWAUKEE, WISCONSIN.

INCUBATOR.

1,392,566.  Specification of Letters Patent.  Patented Oct. 4, 1921.

Application filed February 12, 1917. Serial No. 148,006.

*To all whom it may concern:*

Be it known that I, WILLIAM C. FRITZ, a citizen of the United States, and resident of Milwaukee, in the county of Milwaukee and State of Wisconsin, have invented new and useful Improvements in Incubators, of which the following is a description, reference being had to the accompanying drawings, which are a part of this specification.

The invention relates to incubators.

It is understood by those skilled in the art that an incubator should be so designed, constructed and arranged as to permit the mechanical hatching of eggs in a manner as nearly like the natural process as possible and the present invention has been designed to produce an incubator which will closely approximate nature's course of incubation. To do this it is necessary that the eggs in the nest or incubator body be cooled once every twenty-four hours. Sudden cooling is very damaging to eggs during incubation. When the hen leaves her nest to feed the warmth of the nest prevents the eggs from cooling too suddenly. To imitate this the eggs must be cooled in the same place where they are hatched. In the present construction, while the top of the eggs are kept at 102° to 103° temperature, the desired amount of heat works down through the burlap and warms the fresh air chamber just enough to prevent the eggs from cooling too suddenly when the large door or doors are opened for the purpose of turning and cooling the eggs.

One of the objects of the invention is to provide means for automatically shutting the doors after they have been left open for a certain interval.

The invention further consists in the several features hereinafter set forth and more particularly defined by claims at the conclusion hereof.

In the drawings:

Fig. 2 is a section taken on the line 2—2 of Fig. 1;

Fig. 3 is a section taken on the line 3—3 of Fig. 2;

Figure 5:
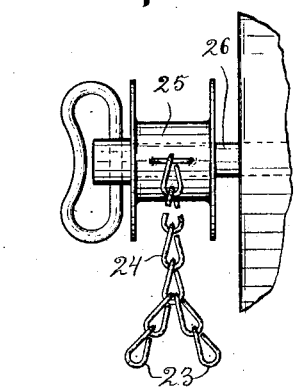
Fig. 5 is a detail view of the alarm control.

In general the device comprises an incubator box, a structure designated as a whole by the numeral 6 and having doors 7, means for holding the doors open to turn and cool the eggs, time controlled means for releasing said door holding means, means for heating the eggs, means for turning the eggs while within the incubator, and means for moistening the air supplied to the incubator.

The incubator structure comprises, a bottom 8 of wood and walls formed by spaced apart boards 9, preferably of wall board, which are braced and secured together by vertically and horizontally extending sets of wood strips 10 and 11, said strips with the boards 7 forming dead air compartments 11' for the purpose of heat insulation. The corners are formed as shown in Fig. 2, the inner board of one wall being interposed between spacing and connecting strips 10 of adjacent walls to form a strong corner construction.

The doors 7 are constructed in the same way as the walls and are hinged to an intermediate top section 12. An egg supporting platform, designated as a whole by the numeral 13 and consisting of a frame 14, and a porous supporting structure consisting of a wire screen 15 and a soft covering 16 of burlap or other material is removably mounted, for the purpose of cleaning, on strips 17 secured to the inside walls of the incubator box above the bottom to form an intervening air space. The platform is made porous to allow the passage of either heated or cold air therethrough and the soft covering upon which the eggs rest imitates the natural nest which is porous and soft. The box body is supported by the legs 7'.

The means for holding the doors 7 open comprises hooks 18 which in each instance are detachably secured at one end to an eye 19 on the door and at their other end 20 to a common eye 21 on a vertical support 22.

Figure 1:
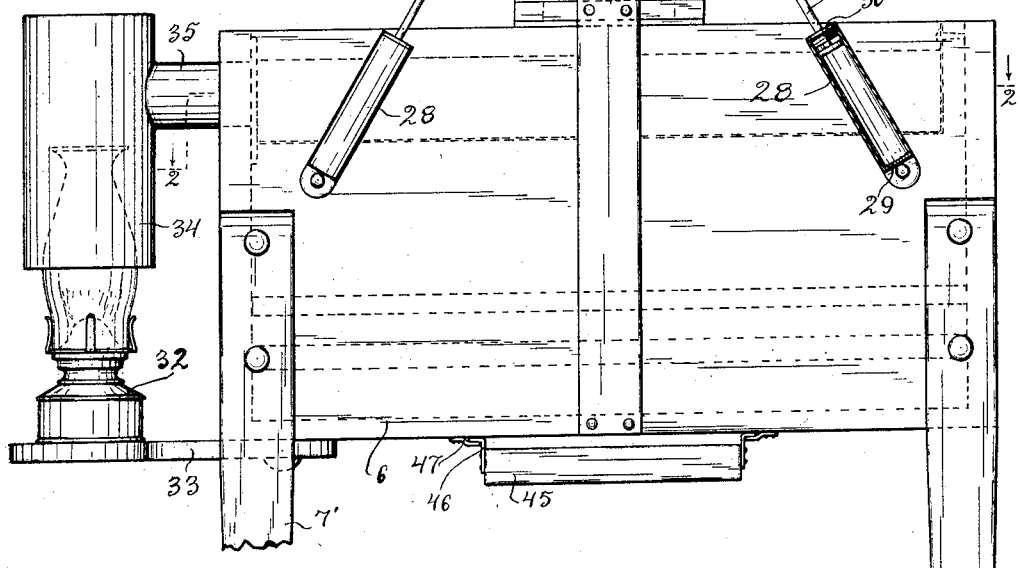
Figure 1 is an elevation view of the device embodying the invention.
Figure 4:
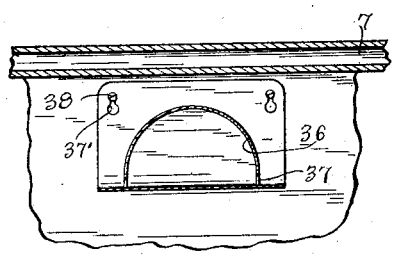
Fig. 4 is a section taken on the line 4—4 of Fig. 3.

The time controlled means for releasing the door holding means comprises chains 23 which are connected to the ends 20 of each hook 18 and to a common chain 24 which is connected to and windable upon a pulley 25 mounted on the alarm spindle 26 of the clock 27. Thus the doors are opened when it is desired to cool the eggs and the hooks 18 set as shown in Fig. 1 to hold the doors open and the alarm is set for the proper time to close the doors. On the operation of the alarm the chain 24 is wound upon the pulley 25 thus pulling the hooks 18 from engagement with the eye 21 whereupon the hooks 18 will be disengaged from the doors which close of their own weight but to prevent jarring and to provide for a gradual closure I have provided a door check consisting of a cylinder 28 pivotally mounted on the body 6 and having an opening 29 in its end and a cap 30 and a piston 31 slidably mounted within said cylinder and pivotally connected at its upper end to the door.

The means for heating the eggs consists of an oil burning lamp 32 mounted upon a support 33 which is pivotally secured to the bottom of the incubator to turn in under it when not in use and to permit the removal of the lamp from the projecting hood 34 which conducts the heated air to a pipe 35 from whence it passes to the radiator 36 consisting of a semi-cylindrical shell having side openings 37 through which the hot air passes into the interior of the incubator and by which the heat is evenly distributed. The radiator for the purpose of cleaning and permitting access to the other parts within the incubator is removably mounted therein by having one end mounted on the pipe 35 and the other end detachably secured to screws 37' engaging in slots 38 having enlarged lower ends to permit disconnection.

The means for turning the eggs comprises a frame 39 of wood, braced at the corners by metal caps 40 and slidably mounted on the egg supporting platform and guided in its movement thereacross by rollers 41 running on the side walls of the body 5. This frame carries a wooden grid or lattice 42 formed by wooden partition strips 43 which form individual egg receiving compartments 44. The eggs are placed in these compartments and during the process of hatching when it is desired to turn the eggs over, the frame 41 is shifted across the supporting platform to turn the eggs, the wooden partition strips 43 performing this function and on a reverse movement of the sliding frame the eggs are turned back.

The means for moistening the eggs comprises a water receptacle 45 having flanged sides 46 removably slidably mounted in guide flanges 47 on the bottom 8 of the incubator and openings 48 in said bottom for allowing the moistened air to pass up into the incubator. The receptacle need not be positioned directly beneath the openings but the air is moistened due to the fact that water on evaporating is dissipated about the bottom of the incubator.

Having described the several parts of the device in detail and their operations a further description of the operation of the device is deemed unnecessary.

It will be noted that the turning of the eggs is accomplished without handling them and in a very simple and expeditious manner.

I am aware that the specific construction herein shown and described is capable of some variation and change but any such structure which comes within the scope of the appended claims I deem to be within the spirit of my invention.

What I claim as my invention is:

1. In an incubator, the combination with the incubator body having hinged doors, of a vertical support, hooks detachably secured to said support and to said doors when the same are opened, time controlled means for releasing the hooks from engagement with the doors, and pneumatic means for checking the rapid descent of the doors and preventing jarring on the closing thereof.

2. In an incubator, the combination with the incubator body having a hinged door, means for releasably securing the door in open position, time controlled means for releasing said securing means, and means for checking the descent of the door and preventing jarring on the closing thereof.

In testimony whereof, I affix my signature.

WILLIAM C. FRITZ.